US011374781B1

(12) United States Patent
Callender et al.

(10) Patent No.: US 11,374,781 B1
(45) Date of Patent: Jun. 28, 2022

(54) SMART DEVICE SPECTRUM ASSIGNMENT

(71) Applicant: T-MOBILE INNOVATIONS LLC, Overland Park, KS (US)

(72) Inventors: Christopher Callender, Overland Park, KS (US); Brian Kuntz, Paola, KS (US); Lyle W. Paczkowski, Mission Hills, KS (US); Michael D. Svoren, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/107,590

(22) Filed: Nov. 30, 2020

(51) Int. Cl.
*H04L 12/28* (2006.01)
(52) U.S. Cl.
CPC .............................. *H04L 12/2816* (2013.01)
(58) Field of Classification Search
CPC . H04L 47/6215; H04L 47/6275; H04L 47/12; H04L 47/22; H04L 12/2816; H04W 4/70; H04W 4/80
See application file for complete search history.

(56) References Cited

U.S. PATENT DOCUMENTS

| | | | | |
|---|---|---|---|---|
| 9,572,184 | B1* | 2/2017 | Erdogan | H04W 4/80 |
| 9,900,171 | B2* | 2/2018 | Guedalia | H04L 67/12 |
| 10,142,122 | B1 | 11/2018 | Hill et al. | |
| 10,223,751 | B1 | 3/2019 | Hutchinson et al. | |
| 10,397,013 | B1 | 8/2019 | Hill et al. | |
| 10,531,360 | B1* | 1/2020 | Govindassamy | H04L 67/322 |
| 2010/0278127 | A1* | 11/2010 | Jeon | H04W 36/06 370/329 |
| 2014/0244834 | A1* | 8/2014 | Gu | H04W 4/21 709/224 |

(Continued)

FOREIGN PATENT DOCUMENTS

| WO | 20180231197 A1 | 12/2018 |
|---|---|---|
| WO | 2022098423 A1 | 5/2022 |

OTHER PUBLICATIONS

Al-Zihad et al., "Bandwidth Allocation and Computation Offloading for Service Specific IiT Edge Devices", Region 10 Humanitarian Technology Conference (R10-HTC), Dec. 21.*

(Continued)

*Primary Examiner* — Todd L Barker (57) ABSTRACT

Aspects of the disclosure provide for a method implemented by a computing device in a network. In some examples, the method includes scanning to identify communication channels available in a same location as the computing device. The method also includes determining characteristics of the identified communication channels and determining characteristics associated with smart home devices in the same location as the computing device. The computing device functions as a communication hub that manages and controls incoming and outgoing communication on at least some of the identified communication channels by at least some of the smart home devices. The method also includes controlling the smart home devices to distribute network connections of the smart home devices among the identified communication channels based on the determined characteristics of the identified communication channels and the determined characteristics associated with the smart home devices in the same location as the computing device.

14 Claims, 7 Drawing Sheets

(56) References Cited

U.S. PATENT DOCUMENTS

| | | | |
|---|---|---|---|
| 2014/0355566 A1* | 12/2014 | Walley | H04W 36/245 370/331 |
| 2015/0139120 A1* | 5/2015 | ElArabawy | H04L 27/3488 370/329 |
| 2016/0050589 A1* | 2/2016 | Safavi | H04W 36/165 455/436 |
| 2016/0277435 A1 | 9/2016 | Salajegheh et al. | |
| 2017/0185757 A1 | 6/2017 | Yang et al. | |
| 2018/0077067 A1 | 3/2018 | Dowlatkhah et al. | |
| 2018/0279389 A1* | 9/2018 | Kwag | H04L 49/555 |
| 2019/0028338 A1 | 1/2019 | Kozura et al. | |
| 2019/0052683 A1 | 2/2019 | Logue et al. | |
| 2019/0223180 A1* | 7/2019 | Feh | H04L 27/2607 |
| 2019/0261243 A1* | 8/2019 | Amini | H04L 43/0858 |
| 2019/0333059 A1 | 10/2019 | Fallah et al. | |
| 2020/0112454 A1 | 4/2020 | Brown et al. | |
| 2020/0162287 A1 | 5/2020 | Wang | |
| 2020/0177449 A1 | 6/2020 | Dakshinyam et al. | |
| 2020/0177517 A1* | 6/2020 | Pancras | H04L 47/6215 |
| 2020/0280827 A1* | 9/2020 | Fechtel | H04W 4/40 |
| 2020/0314247 A1 | 10/2020 | Klinger et al. | |
| 2022/0141221 A1 | 5/2022 | Callender et al. | |

OTHER PUBLICATIONS

Sarnie et al., "Computation offloading and resource allocation for low-power IoT edge devices", 3rd World Forum on an Internet of Things, Dec. 2016, IEEE Publishing.*

Callender, Christopher, et al., "Smart Device Provisioning," filed Nov. 4, 2020, U.S. Appl. No. 17/089,647.

Callender, Christopher, et al., "Smart Computing Device Implementing Artificial Intelligence Electronic Assistant," filed Nov. 20, 2020, U.S. Appl. No. 17/100,681.

Callender, Christopher, et al., "Smart Computing Device Implementing Network Security and Data Arbitration," filed Nov. 5, 2020, U.S. Appl. No. 17/090,763.

Callender, Christopher, et al., "Smart Computing Device Implementing Network Security and Data Arbitration," filed Sep. 1, 2021 International Application No. PCT/US2021/048704.

Restriction Requirement dated Jan. 13, 2022, U.S. Appl. No. 17/089,647, filed Nov. 4, 2020.

Foreign Communication From a Related Counterpart Application, Invitiation to Pay Additional Fees dated Dec. 7, 2021, International Application No. PCT/US2021/048704 filed on Sep. 1, 2021.

Foreign Communication From a Related Counterpart Application, International Search Report and Written Opinion dated Jan. 25, 2022, International Application No. PCT/US2021/048704 filed on Sep. 1, 2021.

Marion, et al.: "Virtualization of Home Network Gateways", Computer, IEEE, USA, vo. 47, No. 11, pp. 62-65, XP01 1564866, Nov. 1, 2014.

FAIPP Pre-Interview Communication dated Mar. 25, 2022, U.S. Appl. No. 17/089,647, filed Nov. 4, 2020.

* cited by examiner

SMART DEVICE SPECTRUM ASSIGNMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A location can include multiple different communication channels that facilitate wired, or wireless, communication. Devices at that location can connect to other devices, or a network, via the communication channels.

SUMMARY

Aspects of the disclosure provide for a method. In some examples, the method is implemented by a computing device in a network. In at least some examples, the method includes scanning to identify communication channels available in a same location as the computing device. The method also includes determining characteristics of the identified communication channels. The method also includes determining characteristics associated with smart home devices in the same location as the computing device. The computing device functions as a communication hub that manages and controls incoming and outgoing communication on at least some of the identified communication channels by at least some of the smart home devices. The method also includes controlling the smart home devices to distribute network connections of the smart home devices among the identified communication channels based on the determined characteristics of the identified communication channels and the determined characteristics associated with the smart home devices in the same location as the computing device.

Other aspects of the disclosure provide for a computing device. In at least some examples, the computing device includes a processor, a non-transitory memory coupled to the processor, and an artificial intelligence electronic assistant application stored in the non-transitory memory. When executed by the processor, the application causes the processor to scan to identify communication channels available in a same location as the computing device, determine characteristics of the identified communication channels, determine characteristics associated with smart home devices in the same location as the computing device, control the smart home devices to distribute network connections of the smart home devices among the identified communication channels based on the determined characteristics of the identified communication channels and the determined characteristics associated with the smart home devices.

Other aspects of the disclosure provide for a system. In at least some examples, the system includes multiple smart home devices and a computing device. The computing device includes a processor, a non-transitory memory coupled to the processor, and an artificial intelligence electronic assistant application stored in the non-transitory memory. When executed by the processor, the application causes the processor to scan to identify communication channels available in a same location as the computing device, determine characteristics of the identified communication channels, determine characteristics associated with smart home devices in the same location as the computing device, and control the smart home devices to distribute network connections of the smart home devices among the identified communication channels according to the determined characteristics of the identified communication channels and the determined characteristics associated with the smart home devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

At a given location, or in a given environment, there may be many available channels for electronic communication. Some of these channels may be wireless and some of the channels may be wired, such as via Ethernet (IEEE 802.3). Examples of wireless channels may include 802.11 wireless (colloquially known as "WiFi"), short or near-range wireless, such as 802.15.1 wireless (colloquially known as "BLUETOOTH"), 802.15.4 wireless (colloquially known as "ZIGBEE"), near field communication (NFC), ultra-wideband, and other forms. Some of these wireless channels may also have multiple frequencies, such as 2.4 gigahertz WiFi and 5 gigahertz WiFi, as well as certain wireless channels themselves having separate channels, such as each available frequency of WiFi being capable of communicating according to a plurality of channels.

Smart home devices continue to become more prevalent and ingrained in the daily lives of users. As used herein, a smart home device is a device that provides functionality to a user that is facilitated by, or augmented by, Internet or other network connectivity. At least some smart home devices may also be referred to as Internet of Things (IoT) devices. Additionally, while the smart home devices are discussed herein with reference to a home, they are equally applicable to, and may be implemented in, other locations such as office buildings, vehicles, etc., and the considerations and teachings of this disclosure apply to all such locations or environments. A non-exhaustive list of example smart home devices includes a network-enabled television, a network-enabled heating, ventilation or air conditioning (HVAC) controller, a network-enabled power supply or switch (e.g., light switch, fan switch, etc.), a network-enabled refrigerator or other kitchen appliance, a network-enabled garage door or garage door opener, network-enabled occupancy sensors, a network-enabled electronic assistant, etc.

These smart home devices interact, or include hardware and/or software to enable the smart home devices to interact, with other devices according to one or more of the available channels for electronic communication. For example, a smart home device may include an option for a wired connection as well as one or more frequencies of WiFi communication. In another example, a smart home device may include an option for one or more frequencies of WiFi communication as well as BLUETOOTH communication. Yet other smart home devices may have cellular communication capability, such as code division multiple access (CDMA), global system for mobile communications (GSM), long-term evolution (LTE), Fifth Generation (5G), and/or other air interface or cellular communication protocol(s). It is appreciated that a smart home device may have any combination of the communication capabilities or functionality discussed herein.

Some of these smart home devices may be programmed to default to a particular channel of communication, or may be set or programmed by a user to a particular channel of communication, which is not optimal for the smart home device in the environment in which the smart home device is located. For example, some of the smart home devices may have varying operational characteristics. A refrigerator implementation of a smart home device may periodically, and for a short period of time, access a communication channel to transmit telemetry data for monitoring health of the refrigerator, a temperature of the refrigerator, etc. In contrast, a smart television implementation of a smart home device may access a communication channel on a near constant basis while displaying media content to a user. Because of this near constant display, the smart television may have different network considerations than the refrigerator, such as minimum bandwidth requirements, quality of service requirements (e.g., low latency, low jitter, etc.), or other considerations and may consume a large amount of bandwidth on a communication channel used by the television. If other high-bandwidth smart home devices are in the same environment and use the same communication channel, performance of the communication channel may degrade such that it cannot satisfy network performance requests or requirements of one or more of the devices communication via the communication channel.

Aspects of the present disclosure provide for a system that interfaces between smart home devices and an external network. The system is, in some examples, a security device or a device that provides, implements, or performs at least some network security functions. In some examples, the system includes further functionality such as being a network gateway device, a mobile hotspot, an electronic assistant, etc. The smart home devices may be registered with the system such that the system operates as a conduit or gatekeeper for data transfer and connections between a smart home device and devices, persons, or entities outside the home network (e.g., a local network existing in the environment in which the system and the smart home devices are located). In some examples, for at least some of the smart home devices registered with the system, the system also operates as a conduit or gatekeeper for data transfer and connections among the smart home devices within the home network. In at least some examples, when the smart home devices are registered with the system, the smart home devices become at least partially subject or subscribed to operational management or control of the system.

When a smart home device is registered with the system, at a programmed or scheduled time, responsive to a user instruction, or responsive to any other suitable triggering event, the system may determine an optimal communication channel for use by the smart home device. To do so, the system may interrogate or scan an environment in which the system is located to identify communication channels that are available in the environment. After identifying the available communication channels, the system may analyze the communication channels, and/or query network elements associated with the communication channels, to determine characteristics associated with the communication channels. The characteristics may include both capabilities of the communication channels, current usage statistics of the communication channels, historical usage statistics of the communication channels (e.g., such as for the past 24 hours, the past week, the past month, the past year, or any other suitable timeframe), etc. For example, for each of the available communication channels, the system may determine any one or more of a bandwidth capacity, a current consumed bandwidth, an average consumed bandwidth, a number of devices communicatively coupled to the communication channel, a latency associated with the communication channel, a jitter associated with the communication channel, a quality of service which the communication channel is capable of providing, etc.

Based on determined characteristics, the system may perform load balancing or otherwise distribute smart home devices which are managed by the system among the available communication channels. For example, as a component of a registration or provisioning process of smart home devices with the system, the system may learn of minimum requirements, optimal characteristics associated with a communication channel, or requested or preferred network capabilities for the smart home devices. Alternatively, or additionally, the system may query the smart home devices at a programmed or scheduled time, responsive to a user instruction, or responsive to any other suitable triggering event to determine network capability needs, average network consumption, etc. of the smart home devices. Based on the determined characteristics of the available communication channels, as well as the determined communication characteristics of a smart home device, the system may control the smart home device to communicatively connect to one of the available communication channels.

In some examples, the system may control multiple smart home devices to distribute the smart home devices among the available communication channels such that no one communication channel is overloaded with high bandwidth smart home devices. For example, the system may control a first of the smart home devices to communicate via a first of the available communication channels (or a first sub-channel of an available communication channel) and control a second of the smart home devices to communicate via a second of the available communication channels (or a second sub-channel of the available communication channel). In this way, the first of the smart home devices and the second of the smart home devices do not compete for bandwidth or otherwise conflict on the same available communication channel (or sub-channel). Thus, the system may control the multiple smart home devices to optimize which of the available communication channels the multiple smart home devices use for communication, increasing performance of not only at least some of the multiple smart home devices, but also at least some of the available communication channels. The communication channels described herein may be single-leg (e.g., directly between a source and a destination) or multi-leg or multi-hop (e.g., between a source and an intermediary, and between the intermediary and a destination). Communication discussed herein may utilize a first leg of a first communication channel and a second leg of a second channel to traverse a path from a source to a destination through an intermediary capable of communication via both the first and second communication channels.

In some examples, the system communicates with an external network via one of the multiple smart home devices. For example, based on the determined characteristics of the available communication channels, as well as the determined communication characteristics of a smart home device, the system may determine that one of the multiple smart home devices has a more robust communication connection to the external network than does the system. The more robust communication connection of the one of the multiple smart home devices to the external network may have more bandwidth, less jitter, less latency, etc. than a communication connection of the system to the external network. This may be a result of the one of the multiple smart home devices having a built-in, or otherwise having access to its own, cellular modem or other transmitter and antenna that enables the one of the multiple smart home devices to communicate with the external network, bypassing a gateway of the home or local network and increasing performance of the system. As discussed above, the communication may be single or multi-leg. For example, the system may determine that an automobile having a cellular connection and within WiFi range of the system provides more robust communication to an external network than another path from the system to the external network. In such an example, the system may connect to the automobile via a WiFi communication channel, and via cellular communication capabilities of the automobile, connect to the external network over a cellular communication channel, thus providing a more robust connection (e.g., increased performance) between the system and the external network.

In at least some examples, the system may function as a session border controller from a perspective of the smart home devices. For example, one of the smart home devices may attempt to frequently communicate with an external network. Based on the session border controller, the system may restrict a number of connections, or a frequency of connections, allowed between the smart home device and the external network. Based on this control, or throttling, the system, may collect, store, summarize, and/or send out an aggregated data summary of a plurality of separate reports from the smart home device. In this way, network congestion is reduced by throttling the multiple communication attempts of the smart home device, but the data attempted to be transmitted by the smart home device is still transmitted by the system at a later time and in an aggregate manner.

The system as discussed above and elsewhere herein, in at least some examples, improves a communication network with which the system is in communication. In some examples, the system also improves other devices, such as the smart home devices, communicatively coupled to the communication network. For example, based on the detection of available communication channels, their characteristics, and characteristics of smart home devices communicating via those communication channels, the system described herein performs load balancing among the communication channels. The load balancing performed by the system improves the performance of at least some of the smart home devices, reducing a latency or jitter associated with the communications, when compared with performance in the communication network does not perform the load balancing. The system may provide enhanced security for smart home devices by acting, at least in a part, as a gatekeeper or mediator between the smart home devices and the Internet. In addition, the system may improve performance of the communication network or at least some of the smart home devices by controlling at least some of the smart home devices to communicate via communication channels that provide an optimal performance available for activities occurring in the communication network and/or being performed by at least some of the smart home devices.

Figure 1:
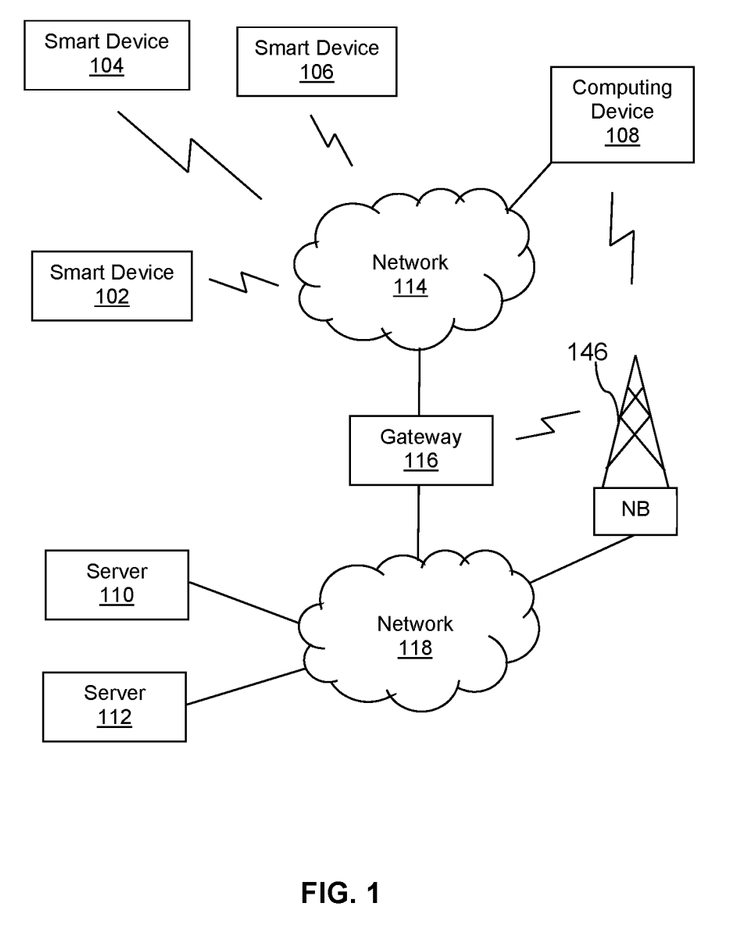
FIG. 1 is a block diagram of a system according to an embodiment of the disclosure.

Turning now to FIG. 1, a block diagram of an illustrative system 100 is described. In at least one example, the system 100 includes a smart home device 102, a smart home device 104, a smart home device 106, a computing device 108, a server 110, a server 112, a network 114, a gateway 116, and a network 118. In at least some examples, the smart home device 102, the smart home device 104, the smart home device 106, and the computing device 108 are located in a first location such as a house, an office building, etc. and are communicatively coupled together, through wireless and/or wired couplings, via the network 114. The network 114 is, in some examples, communicatively coupled to the network 118 via the gateway 116. In at least some examples, one or more of the smart home device 102, the smart home device 104, the smart home device 106, and/or the computing device 108 is also communicatively coupled to the network 118 via a communication channel other than through the gateway 116, such as a Node B (NB) 146. The NB 146 may be an enhanced NB (eNB) used in LTE communications, a gigabit NB (gNB) used in 5G communications or 5G New Radio communications, or any other access node according to any suitable radio access technology to communicatively couple devices, wirelessly, to the network 118. The server 110 is, in some examples, associated with one or more of the smart home device 102, the smart home device 104, and/or the smart home device 106 and is communicatively coupled to the network 114 via the network 118. The server 112 is, in some examples, associated with the computing device 108 and is communicatively coupled to the computing device 108 via the network 114, gateway 116, and network 118.

At least some implementations of the computing device 108 function as a security device, at least partially securing operation of the smart home device 102, the smart home device 104, and/or the smart home device 106. For example, after one of the smart home device 102, the smart home device 104, or the smart home device 106 is registered or provisioned with the computing device 108, or the server 112, communication to that one of the smart home device 102, the smart home device 104, or the smart home device 106 passing between the network 114 and the network 118 passes through the computing device 108. In this way, the computing device 108 functions as a gatekeeper or arbiter of the data communication. In at least some examples, data communication among the smart home device 102, the smart home device 104, and/or the smart home device 106 within the network 114 also passes through the computing device 108. In such examples, the computing device 108 is the gate keeper or arbiter of both wide area network data communication (e.g., data communication between networks 114 and 118) and local area network data communication (e.g., data communication within the network 114) for the one or more of the smart home device 102, the smart home device 104, and/or the smart home device 106 that have been registered with the computing device 108 or the server 112. In other examples, the data communication of the smart home device 102, the smart home device 104, or the smart home device 106 does not pass through the computing device 108, but is instead subject to control of the computing device 108.

At least some implementations of the computing device 108 implement an artificial intelligence overlay that operates as an electronic assistant. In some examples, the computing device 108 is a purpose-built device. In other examples, the computing device 108 is implemented as an executable on any device having suitable processing capacity, such as a desktop computer, a server computer, a laptop computer, processor in an automobile or other transportation vehicle, a television, a phone, a wearable device, an IoT device, etc. By implementing the artificial intelligence overlay on one of the above computing devices, such computing device becomes a smart device.

The smart home devices 102, 104, and 106 are any devices having smart, or IoT, functionality, as discussed above. For example, various implementations of the smart home device 102, smart home device 104, and/or smart home device 106 include a smart light switch, a smart television, a smart audio system, a smart thermostat device or other climate control device, smart refrigerator, a smart coffee maker or other consumer device, etc. The network 114 is, in some examples, a local area network. For example, in some implementations the network 114 is a home network provided by one or more access points and operating according to conventional wireless technologies such as via a BLUETOOTH interface, WiFi interface, a NFC interface, etc. Additionally, although illustrated as a single network, in at least some examples the network 114 is representative of multiple communication channels (or sub-channels), multiple networks, etc. For example, in one implementation the network 114 may be representative of a WiFi communication channel and a BLUETOOTH communication channel.

The network 118 is, in some examples, a wide area network. For example, the network 118 is a network or a communications service provider and is communicatively coupled to the gateway 116 via a wired or wireless distribution network. For example, the network 118 may be communicatively coupled to the gateway 116 via wired cables such as copper-based cables or fiber-optic cables. Alternatively, the network 118 may be communicatively coupled to the gateway 116 via wireless protocol(s) implemented via radio transceiver cards that promote radio communications using protocols such as CDMA, GSM, LTE, 5G, and/or other air interface protocol(s).

The gateway 116 is any device suitable for facilitating communication between the network 114 and the network 118. Accordingly, in some examples, the gateway 116 is a router. While the gateway 116 is illustrated as having a hardwired connection to the network 118, in some examples such a connection does not exist. Instead, in such examples the gateway 116 is communicatively coupled to the network 118 via the NB 146. The gateway 116 may be a mobile hotspot that communicates with the network 118 via the NB 146 and that is coupled to the network 114. In yet other examples, the gateway 116 also includes wireless router functionality such that the gateway 116 generates or creates the network 114. Further, in at least some examples, and although illustrated separately in FIG. 1, the computing device 108 and the gateway 116 are co-located in a same device. For example, the gateway 116 may be a mobile hotspot that enables a device, communicatively coupled wirelessly or via a wired connection to the gateway 116, to be communicatively coupled to the NB 146 and network 118 and also has processing capability. That processing capability of the gateway 116 may implement the artificial intelligence overlay (e.g., an artificial intelligence software application) that operates as the electronic assistant, data arbiter, and/or communication channel assigner, as discussed elsewhere herein.

To begin, the computing device 108 is provisioned to the network 118 and/or the server 112, for example, by executing code on the computing device 108. The code, in at least some examples, enables the computing device 108 to discover one or more of the smart home devices 102, 104, and/or 106 and provision the discovered smart home devices to an ecosystem managed by the computing device 108. As a portion of the provisioning process, following the provisioning process, at scheduled times or intervals, responsive to user input, and/or responsive to any other triggering event, the computing device 108 may determine an optimal communication channel for use by the smart home devices 102, 104, and/or 106. In some examples, the computing device may further control the smart home devices 102, 104, and/or 106 to communicate according to, or via, that determined optimal communication channel.

To determine the optimal communication channel, in at least some examples the computing device 108 scans or interrogates a physical environment in which it is located. In some examples, such a scanning includes the computing device 108 analyzing a radio frequency spectrum proximate to, and accessible by, the computing device 108. In at least some examples, the computing device 108 additionally, or alternatively, communicates with the smart home devices 102, 104, and/or 106 to determine communication channel capabilities and operating statistics of the smart home devices 102, 104, and/or 106, respectively. The operating statistics are, for example, characteristics associated with use of the communication channel(s) by a respective one of the smart home devices 102, 104, and/or 106 under interrogation. For example, for each, or at least some, of the available communication channels and/or for each, or at least some, of the smart home devices 102, 104, and/or 106, the system may determine any one or more of a bandwidth capacity, a current consumed bandwidth, an average consumed bandwidth, a number of devices communicatively coupled to the communication channel, a latency associated with the communication channel, a jitter associated with the communication channel, a quality of service which the communication channel is capable of providing, etc.

Based on the determined communication channel capabilities and operating statistics of the smart home devices 102, 104, and/or 106, the computing device 108 may control the smart home devices 102, 104, and/or 106 to distribute communications of the smart home devices 102, 104, and/or 106 among the communications channels of the network 114. For example, the computing device 108 may control the smart home devices 102, 104, and/or 106 to load balance the communication channels (e.g., the network 114). The load balancing may prevent bandwidth consumption of a communication channel from exceeding a programmed percentage of a bandwidth capacity of the communication channel, to reduce latency of the communication channel, etc.

For example, one or more of the smart home devices 102, 104, and/or 106 may communicate data that is given a higher priority in the network 114. In another example, one or more of the smart home devices 102, 104, and/or 106 may communicate data that consumes a greater amount of bandwidth than data of other of the smart home devices 102, 104, and/or 106. In another example, one or more of the smart home devices 102, 104, and/or 106 may communicate data that has lower jitter requirements than data of other of the smart home devices 102, 104, and/or 106. To provide the smart home devices 102, 104, and/or 106 with a quality of service with respect to the network 114 that facilitates intended, desired, or programmed operation of the respective smart home device 102, 104, and/or 106, the computing device 108 may load balance the network 114. Performing the load balancing, in various examples, prevents multiple high-bandwidth devices from communicating via the same communication channel, reduces a number of devices benefiting from low latency communication that share a single communication channel, or otherwise assign devices to communication channels such that detrimental impact of communication of the devices on other devices is minimized and performance of communication of the devices is increased. The computing device 108 may control the smart home devices 102, 104, and/or 106 to perform the load balancing, in at least some examples, by interacting with the smart home devices 102, 104, and/or 106 via APIs.

Further, in some examples, the computing device 108 may determine based on the determined communication channel capabilities, operating statistics of the computing device 108, and/or capabilities of one of the smart home devices 102, 104, or 106, that the one of the smart home devices 102, 104, or 106 has a more robust connection to the network 118 than does the computing device 108. The more robust connection to the network may be, for example, from the one of the smart home devices 102, 104, or 106 to the network 118 via the NB 146. In such examples, the computing device 108 may communicate with the network 118 via the one of the smart home devices 102, 104, or 106, bypassing the gateway 116.

Figure 2:
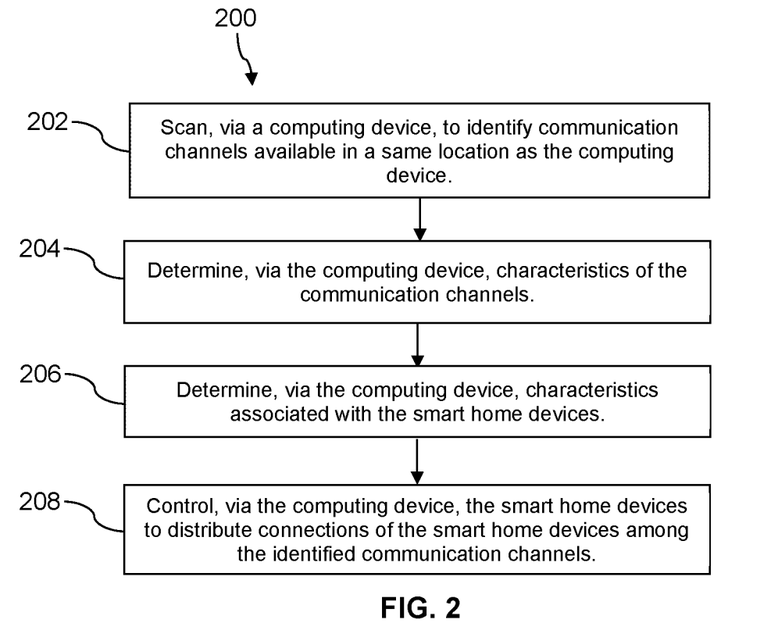
FIG. 2 is a flow chart of an illustrative method according to an embodiment of the disclosure.

FIG. 2 illustrates a flowchart of a method 200 for load balancing in a network. The method 200 is implemented, in some examples, by a computing device such as the computing device 108 of the system 100, described above with respect to FIG. 1. The computing device implements the method 200, in some examples, to load balance a network by optimizing communication channel usage of smart home devices.

At operation 202, the computing device scans to identify communication channels available in a same location as the computing device. The computing device may perform the scan, in some examples, via executable code that instructs a processor to perform a spectrum analysis of a radio frequency spectrum accessible by an antenna coupled to the computing device. The computing device may further perform a scan of a wired connection, such as an ethernet connection, accessible to the computing device.

At operation 204, the computing device may determine characteristics of the communication channels. In at least some examples, the computing device may determine the characteristics of the communication channels by performing tests of the communication channels. The tests may include tests that determine a bandwidth, throughput, jitter, latency, or other characteristics of the communication channels. In other examples, the computing device may determine the characteristics of the communication channels by querying or interrogating a network element, such as a wireless access point, that generates signals associated with at least some of the communication channels.

At operation 206, the computing device may determine characteristics associated with the smart home devices. In at least some examples, the computing device may determine the characteristics of the smart home devices by querying or interrogating the smart home devices to determine operating statistics of the smart home devices. The operating statistics are, for example, characteristics associated with use of the communication channel(s) by the smart home devices. For example, for each, or at least some, of the smart home devices, the computing device may determine a requested quality of service for a communication channel, a requested bandwidth, a requested maximum jitter, a requested maximum latency, etc. of the smart home devices.

At operation 208, the computing device controls the smart home devices to distribute network connections of the smart home devices among the identified communication channels. The computing device distributes the network connections of the smart home devices among the identified communication channels, in some examples, to perform load balancing. Performing the load balancing, in various examples, prevents multiple high-bandwidth smart home devices from communicating via the same communication channel, reduces a number of smart home devices benefiting from low latency communication that share a single communication channel, or otherwise assigns smart home devices to communication channels such that detrimental impact of communication of the smart home devices on other devices is reduced and performance of communication of the smart home devices is increased. The computing device may control the smart home devices to perform the load balancing, in at least some examples, by interacting with the smart home devices via APIs.

Figure 3:
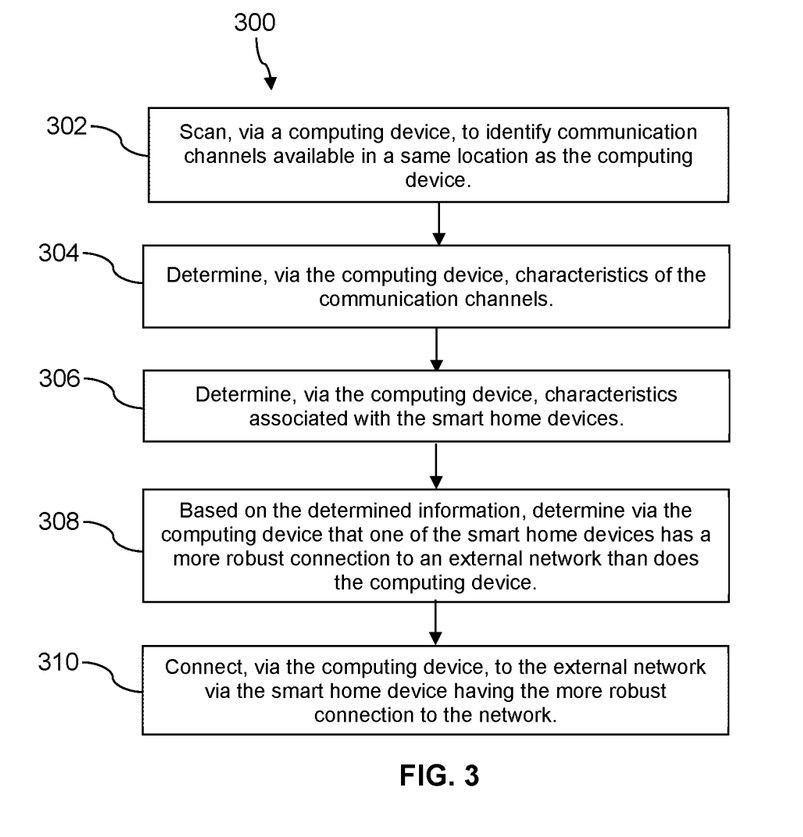
FIG. 3 is a flow chart of an illustrative method according to an embodiment of the disclosure.

FIG. 3 illustrates a flowchart of a method 300 for network access. The method 300 is implemented, in some examples, by a computing device such as the computing device 108 of the system 100, described above with respect to FIG. 1. The computing device implements the method 300, in some examples, to access a network.

At operation 302, the computing device scans to identify communication channels available in a same location as the computing device. The computing device may perform the scan, in some examples, via executable code that instructs a processor to perform a spectrum analysis of a radio frequency spectrum accessible by an antenna coupled to the computing device. The computing device may further perform a scan of a wired connection, such as an ethernet connection, accessible to the computing device.

At operation 304, the computing device may determine characteristics of the communication channels. In at least some examples, the computing device may determine the characteristics of the communication channels by performing tests of the communication channels. The tests may include tests that determine a bandwidth, throughput, jitter, latency, or other characteristics of the communication channels. In other examples, the computing device may determine the characteristics of the communication channels by querying or interrogating a network element, such as a wireless access point, that generates signals associated with at least some of the communication channels.

At operation 306, the computing device may determine characteristics associated with the smart home devices. In at least some examples, the computing device may determine the characteristics of the smart home devices by querying or interrogating the smart home devices to determine operating statistics of the smart home devices. The operating statistics are, for example, characteristics associated with use of the communication channel(s) by the smart home devices. For example, for each, or at least some, of the smart home devices, the computing device may determine a requested quality of service for a communication channel, a requested bandwidth, a requested maximum jitter, a requested maximum latency, etc. of the smart home devices.

At operation 308, based on the determined information, the computing device determines that one of the smart home devices has a more robust connection to an external network than does the computing device. The more robust connection to the external network may be, for example, from the one of the smart home devices to the external network via a NB or other cellular protocol or air interface.

At operation 310, connecting to the external network via the smart home device having the more robust connection to the network. In such examples, the computing device may communicate with the external network via the one of the smart home devices bypassing a gateway through which the computing device would otherwise communicate with the external network.

Figure 4A:
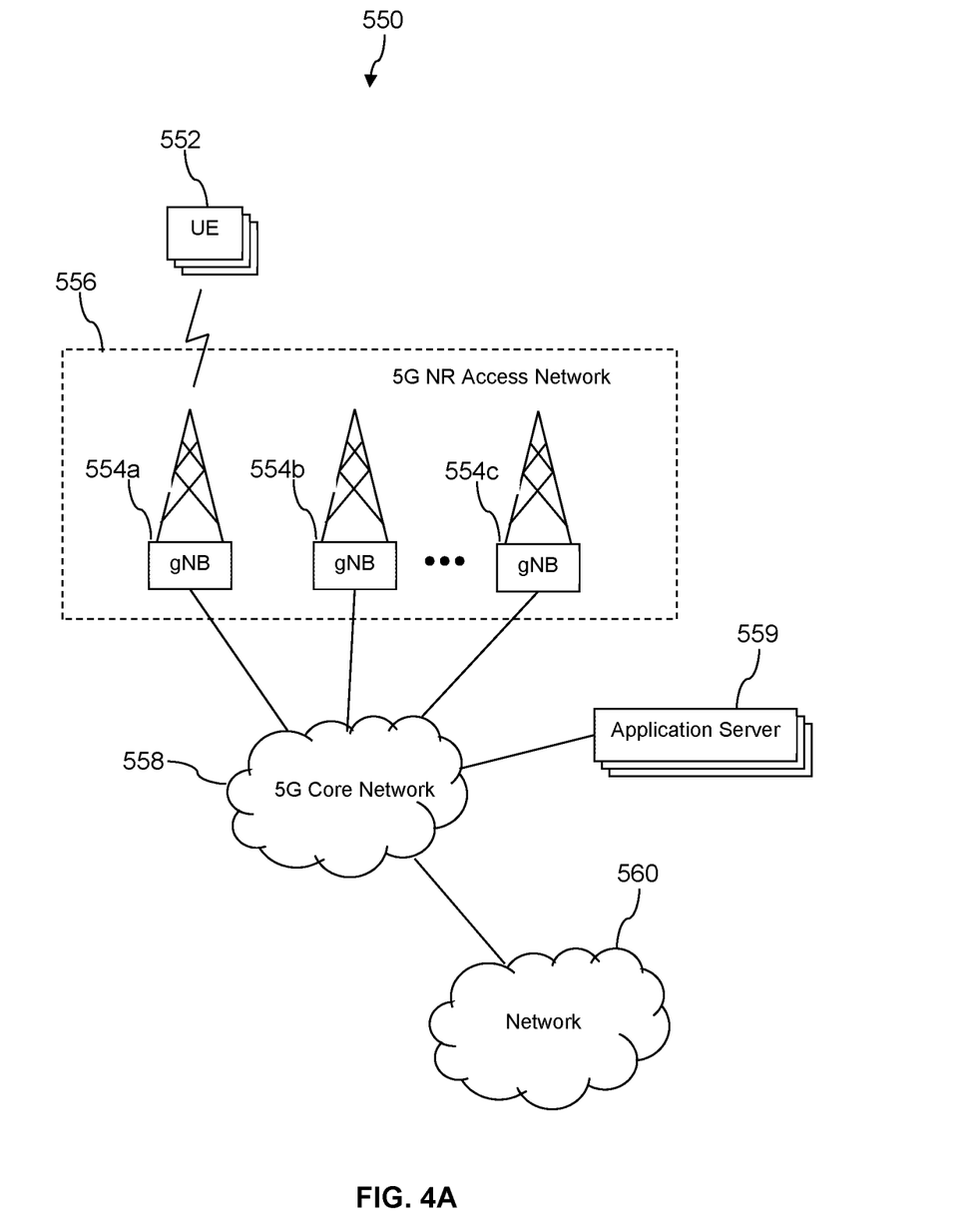
FIG. 4A is an exemplary communication system according to an embodiment of the disclosure.

Turning now to FIG. 4A, an exemplary communication system 550 is described. Typically the communication system 550 includes a number of access nodes 554 that are configured to provide coverage in which UEs 552 such as cell phones, smart home devices, computing devices, tablet computers, machine-type-communication devices, tracking devices, embedded wireless modules, and/or other wirelessly equipped communication devices (whether or not user operated), can operate. In at least some examples, the smart home devices 102, 104, and/or 106, and/or the computing device 108, all of FIG. 1, operate according to the coverage provided by the access nodes 554. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., LTE technology) an access node 554 may be referred to as an enhanced Node B (eNB). In 3G technology (e.g., CDMA and GSM) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be discovered close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could discover as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 4B:
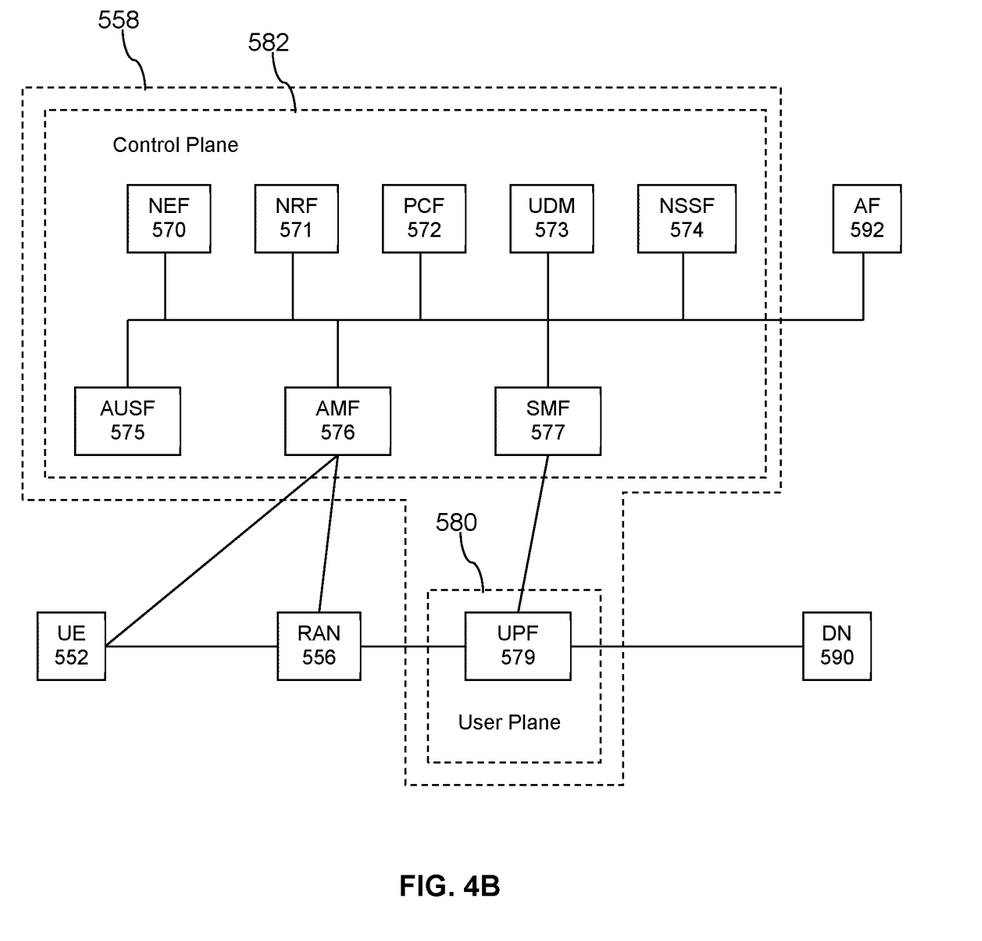
FIG. 4B is an exemplary core network according to an embodiment of the disclosure.

Turning now to FIG. 4B, further details of the core network 558 are described. In an embodiment, the core network 558 is a 5G core network. 5G core network technology is based on a service-based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 4A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be discovered outside of the core network 558, exposes the application layer for interacting with the core network 558. In an embodiment, the application function 592 may be execute on an application server 559 discovered geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 5A:
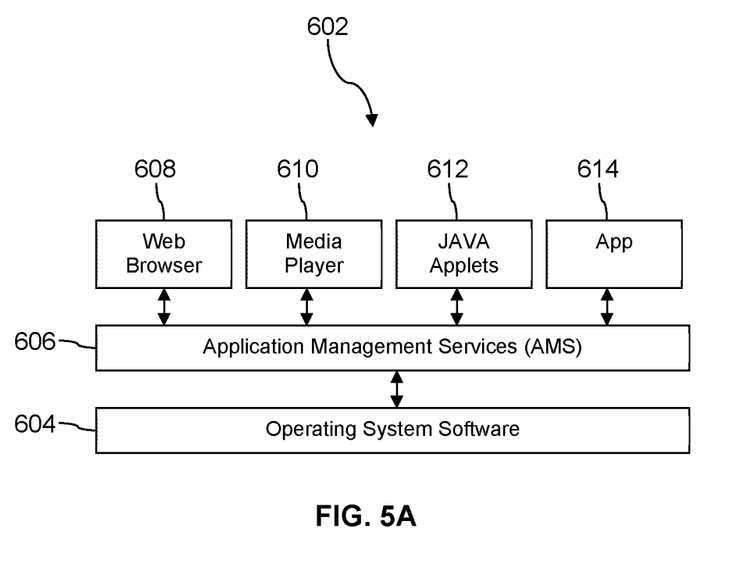
FIG. 5A is an example software environment according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality. The App 614 may be executed by the UE 400 to facilitate the spectrum assignment of the present disclosure.

Figure 5B:
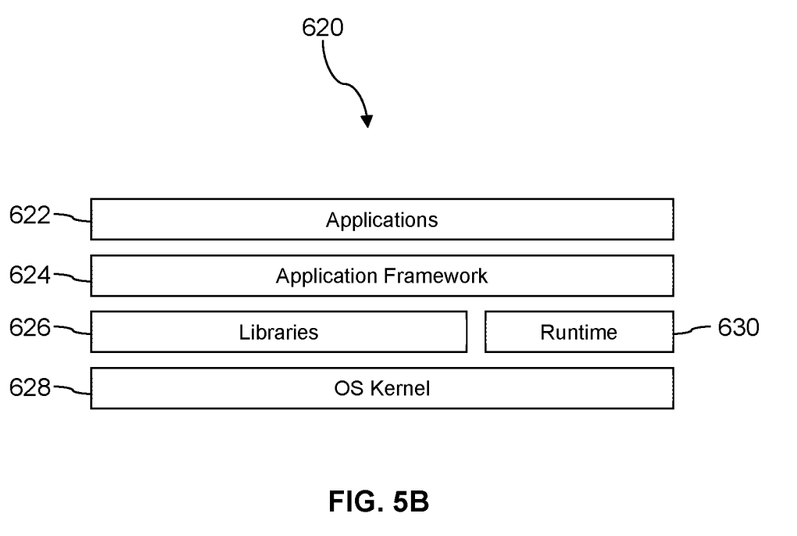
FIG. 5B is an example alternative software environment according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
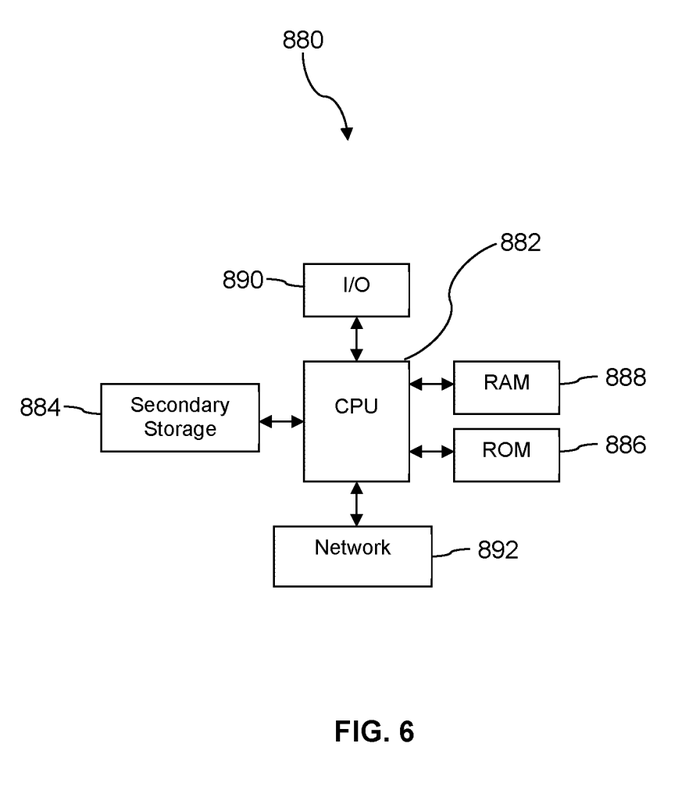
FIG. 6 is a block diagram of an illustrative computer system according to an embodiment of the disclosure.

FIG. 6 illustrates a computer system 880 suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 880 is turned on or booted, the CPU 882 may execute a computer program or application. For example, the CPU 882 may execute software or firmware stored in the ROM 886 or stored in the RAM 888. In some cases, on boot and/or when the application is initiated, the CPU 882 may copy the application or portions of the application from the secondary storage 884 to the RAM 888 or to memory space within the CPU 882 itself, and the CPU 882 may then execute instructions that the application is comprised of. In some cases, the CPU 882 may copy the application or portions of the application from memory accessed via the network connectivity devices 892 or via the I/O devices 890 to the RAM 888 or to memory space within the CPU 882, and the CPU 882 may then execute instructions or code that the application is comprised of. During execution, an application may load instructions into the CPU 882, for example load some of the instructions of the application into a cache of the CPU 882. In some contexts, an application that is executed may be said to configure the CPU 882 to do something, e.g., to configure the CPU 882 to perform the function or functions promoted by the subject application. When the CPU 882 is configured in this way by the application, the CPU 882 becomes a specific purpose computer or a specific purpose machine.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as computer readable storage media and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 892 may provide wired communication links and/or wireless communication links (e.g., a first network connectivity device 892 may provide a wired communication link and a second network connectivity device 892 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, GSM, LTE, WiFi (e.g., IEEE 802.11), BLUETOOTH, ZIGBEE, narrowband Internet of things (NB IoT), NFC, and/or radio frequency identity (RFID). The radio transceiver cards may promote radio communications using 5G, 5G New Radio, or 5G LTE radio communication protocols. These network connectivity devices 892 may enable the processor 882 to communicate with the Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), flash drive, ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data structures in part by directly accessing the computer program product, for example by reading from a CD-ROM disk inserted into a disk drive peripheral of the computer system 880. Alternatively, the processor 882 may process the executable instructions and/or data structures by remotely accessing the computer program product, for example by downloading the executable instructions and/or data structures from a remote server through the network connectivity devices 892. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

In some contexts, the secondary storage 884, the ROM 886, and the RAM 888 may be referred to as a non-transitory computer readable medium or a computer readable storage media. A dynamic RAM embodiment of the RAM 888, likewise, may be referred to as a non-transitory computer readable medium in that while the dynamic RAM receives electrical power and is operated in accordance with its design, for example during a period of time during which the computer system 880 is turned on and operational, the dynamic RAM stores information that is written to it. Similarly, the processor 882 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented by a computing device in a network, comprising:

scanning to identify communication channels available in a same location as the computing device, wherein each of the communication channels corresponds to a different communication protocol;

determining characteristics of the identified communication channels;

determining characteristics associated with smart home devices in the same location as the computing device, wherein the computing device functions as a communication hub that manages and controls incoming and outgoing communication on at least some of the identified communication channels by at least some of the smart home devices;

controlling the smart home devices to distribute network connections of the smart home devices among the identified communication channels based on the determined characteristics of the identified communication channels and the determined characteristics associated with the smart home devices in the same location as the computing device;

determining that one of the smart home devices has a more robust connection to an external network than does the computing device, wherein the more robust connection is a connection that has increased performance metrics in comparison to a connection of the computing device; and connecting to the external network via the one of the smart home devices having the more robust connection to the external network than does the computing device by bypassing a gateway through which the computing device would otherwise communicate with the external network in an absence of the one of the smart home devices, wherein a first of the smart home devices is controlled to transmit communications via a first of the communication channels via the gateway responsive to the determined characteristics of the identified communication channels and the determined characteristics associated with the smart home devices in the same location as the computing device and a second of the smart home devices is controlled to transmit communications via a second of the communication channels using the one of the smart home devices having the more robust connection to the external network than does the computing device responsive to the determined characteristics of the identified communication channels and the determined characteristics associated with the smart home devices in the same location as the computing device.

2. The method of claim 1, wherein the computing device transmits at least communication received by the computing device from at least some of the smart devices to the external network by routing at least some of the communication through the one of the smart home devices having the more robust connection to the external network than does the computing device rather than through a connection of the computing device to the external network.

3. The method of claim 1, wherein the computing device is communicatively coupled to an external network and transmits at least communication received by the computing device from at least some of the smart devices to the external network via the communicative coupling of the computing device to the external network.

4. The method of claim 1, wherein the characteristics of the identified communication channels include a maximum bandwidth, jitter, and latency, and wherein the characteristics associated with the smart home devices include a requested quality of service for a communication channel, a requested bandwidth, a requested maximum jitter, and a requested maximum latency.

5. The method of claim 1, wherein controlling the smart home devices to distribute network connections of the smart home devices among the identified communication channels comprise distributing network connections of the smart home devices among the identified communication channels to balance a network load of the smart home devices among the identified communication channels.

6. A computing device, comprising:
a processor;
a non-transitory memory coupled to the processor; and
an artificial intelligence electronic assistant application stored in the non-transitory memory that, when executed by the processor:
scan to identify communication channels available in a same location as the computing device, wherein each of the communication channels corresponds to a different communication protocol;
determine characteristics of the identified communication channels;
determine characteristics associated with smart home devices in the same location as the computing device;
control the smart home devices to distribute network connections of the smart home devices among the identified communication channels based on the determined characteristics of the identified communication channels and the determined characteristics associated with the smart home devices;
determine that one of the smart home devices has a more robust connection to an external network than does the computing device, wherein the more robust connection is a connection that has increased performance metrics in comparison to a connection of the computing device; and
connect to the external network via the one of the smart home devices having the more robust connection to the computing network than does the computing device by bypassing a gateway through which the computing device would otherwise communicate with the external network in an absence of the one of the smart home devices,
wherein a first of the smart home devices is controlled to communicate via a first of the communication channels via the gateway based on the determined characteristics of the identified communication channels and the determined characteristics associated with the smart home devices, and
wherein a second of the smart home devices is controlled to communicate via a second of the communication channels using the one of the smart home devices having the more robust connection to the external network than does the computing device based on the determined characteristics of the identified communication channels and the determined characteristics associated with the smart home devices.

7. The computing device of claim 6, wherein the communication channels include WiFi, BLUETOOTH, near field communication (NFC), and ethernet.

8. The computing device of claim 6, wherein the characteristics of the identified communication channels include a maximum bandwidth, jitter, and latency.

9. The computing device of claim 6, wherein the characteristics associated with the smart home devices include a requested quality of service for a communication channel, a requested bandwidth, a requested maximum jitter, and a requested maximum latency.

10. The computing device of claim 6, wherein the processor controlling the smart home devices to distribute network connections of the smart home devices among the identified communication channels comprises distributing network connections of the smart home devices among the identified communication channels to balance a network load of the smart home devices among the identified communication channels.

11. A system, comprising:
multiple smart home devices; and
a computing device, comprising:
a processor;
a non-transitory memory coupled to the processor; and
an artificial intelligence electronic assistant application stored in the non-transitory memory that, when executed by the processor:
scan to identify communication channels available in a same location as the computing device, wherein each of the communication channels corresponds to a different communication protocol;
determine characteristics of the identified communication channels;
determine characteristics associated with smart home devices in the same location as the computing device;
control the smart home devices to distribute network connections of the smart home devices among the identified communication channels according to the determined characteristics of the identified communication channels and the determined characteristics associated with the smart home devices;
determine that one of the smart home devices has a more robust connection to an external network than does the computing device, wherein the more robust connection is a connection that has increased performance metrics in comparison to a connection of the computing device; and
connects to the external network via the one of the smart home devices having the more robust connection to the computing network than does the computing device by bypassing a gateway through which the computing device would otherwise communicate with the external network in an absence of the one of the smart home devices,
wherein based on the determined characteristics of the identified communication channels and responsive to a determined characteristic of a first of the smart home devices having a first value, the first of the smart home devices is controlled to communicate via a first of the communication channels via the gateway, and
wherein based on the determined characteristics of the identified communication channels and responsive to a determined characteristic of a second of the smart home devices having a second value, the second of the smart home devices is controlled to communicate via a second of the communication channels using the one of the smart home devices having the more robust connection to the external network than does the computing device.

12. The system of claim 11, wherein the communication channels include WiFi, BLUETOOTH, near field communication (NFC), and ethernet, and wherein the characteristics of the identified communication channels include a maximum bandwidth, jitter, and latency.

13. The system of claim 11, wherein the characteristics associated with the smart home devices include a requested quality of service for a communication channel, a requested bandwidth, a requested maximum jitter, and a requested maximum latency.

14. The system of claim 11, wherein the processor controlling the smart home devices to distribute network connections of the smart home devices among the identified communication channels comprises distributing network connections of the smart home devices among the identified communication channels to balance a network load of the smart home devices among the identified communication channels.

* * * * *